US010506086B2

(12) United States Patent
Hu et al.

(10) Patent No.: US 10,506,086 B2
(45) Date of Patent: Dec. 10, 2019

(54) OPTICAL SYSTEM AND DRIVING MODULE THEREIN WITHOUT POSITION-SENSING ELEMENT

(71) Applicant: TDK TAIWAN CORP., Yangmei Taoyuan (TW)

(72) Inventors: Chao-Chang Hu, Yangmei Taoyuan (TW); Shih-Ting Huang, Yangmei Taoyuan (TW); Kuo-Chun Kao, Yangmei Taoyuan (TW); Yi-Hsin Nieh, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 71 days.

(21) Appl. No.: 15/782,254

(22) Filed: Oct. 12, 2017

(65) Prior Publication Data

US 2018/0115636 A1    Apr. 26, 2018

Related U.S. Application Data

(60) Provisional application No. 62/410,579, filed on Oct. 20, 2016.

(30) Foreign Application Priority Data

Sep. 27, 2017  (CN) .......................... 2017 1 0890027

(51) Int. Cl.
*H04M 1/02*    (2006.01)
*H04N 5/225*    (2006.01)
(Continued)

(52) U.S. Cl.
CPC ............ *H04M 1/0264* (2013.01); *G02B 7/08* (2013.01); *G02B 7/102* (2013.01); *G02B 27/0012* (2013.01); *G02B 27/646* (2013.01); *H02K 41/02* (2013.01); *H02K 41/0356* (2013.01); *H04N 5/2252* (2013.01); *H04N 5/2257* (2013.01); *G02B 13/001* (2013.01)

(58) Field of Classification Search
CPC ........ G02B 27/64; G02B 27/646; G02B 7/08; G02B 7/102; G02B 13/001; G02B 27/0012; H04N 5/2252; H04N 5/2253; H04N 5/2254; H04N 5/2257; H01M 1/0264; H02K 41/02; H02K 41/0356
See application file for complete search history.

(56) References Cited

U.S. PATENT DOCUMENTS 9,554,023 B2 *   1/2017   Park ................... H02K 41/0356
9,794,459 B1 *  10/2017   Kim ....................... G02B 5/208
(Continued)

*Primary Examiner* — Ngoc Yen T Vu
(74) *Attorney, Agent, or Firm* — Muncy, Geissler, Olds & Lowe, P.C.

(57) ABSTRACT

The disclosure provides an optical system including an optical element and a driving module. The driving module includes a fixed part and an electromagnetic driving assembly. The fixed part includes a casing and a circuit unit. The circuit unit is connected to the casing and includes a base and a circuit element. The electromagnetic driving assembly is disposed inside the casing and is electrically connected to the circuit element. The electromagnetic driving assembly is configured to force the optical element to move relative to the base. There is no position-sensing component disposed inside the driving module.

16 Claims, 11 Drawing Sheets

(51) Int. Cl.
*G02B 27/64* (2006.01)
*G02B 7/10* (2006.01)
*G02B 27/00* (2006.01)
*G02B 7/08* (2006.01)
*H02K 41/02* (2006.01)
*H02K 41/035* (2006.01)
*G02B 13/00* (2006.01)

(56) References Cited

U.S. PATENT DOCUMENTS

| | | | |
|---|---|---|---|
| 9,810,919 B2 * | 11/2017 | Terajima | H04M 1/0264 |
| 9,939,037 B2 * | 4/2018 | Ogino | H04M 1/0264 |
| 9,948,226 B2 * | 4/2018 | Kim | H02P 25/034 |
| 10,133,023 B2 * | 11/2018 | Bai | G02B 7/04 |
| 2017/0245360 A1 * | 8/2017 | Jung | H04M 1/0264 |

* cited by examiner

OPTICAL SYSTEM AND DRIVING MODULE THEREIN WITHOUT POSITION-SENSING ELEMENT

CROSS REFERENCE TO RELATED APPLICATIONS

This application claims the benefit of U.S. Provisional Application No. 62/410,579, filed. Oct. 20, 2016, and claims priority of China Patent Application No. 201710890027.6, filed Sep. 27, 2017, the entirety of which are incorporated by reference herein.

BACKGROUND

Technical Field

The disclosure relates to an optical system and a driving module thereof, and in particular to an optical system without position-sensing elements and a driving module thereof.

Description of the Related Art

As technology develops, many electronic devices (such as smartphones) nowadays have a camera or video function. Using the camera module disposed on the electronic devices, users can operate the electronic devices to capture various photographs.

Generally, the camera module has a position sensor, a control unit and a lens-driving unit, and the lens-driving unit can be configured to force a lens to move along the optical axis of the lens. When the camera module is shaken, the position sensor can sense the displacement of the lens, and the control unit can control the lens-driving unit to force the lens to move in the opposite direction based on the displacement to achieve the goal of image-stabilization. However, the position sensor takes up space in the interior of the camera module. Therefore, when the thickness of the electronic device needs to be reduced for the purpose of miniaturization, the thickness of the camera module cannot be reduced any further due to the size of the position sensor.

Therefore, how to prevent the position sensor from taking up too much space inside the camera module, and how to reduce the thickness of the camera module, are topics nowadays that need to be discussed and solved.

BRIEF SUMMARY

As set forth above, some embodiments of the present disclosure provide an optical system to solve the aforementioned problems.

Some embodiments of the present disclosure provide an optical system, including an optical element and a driving module. The driving module includes a fixed portion and an electromagnetic driving assembly. The fixed portion includes a casing and a circuit unit. The circuit unit is connected to the casing, and the circuit unit includes a base and a circuit element. The electromagnetic driving assembly is disposed inside the casing and electrically connected to the circuit element. The electromagnetic driving assembly is configured to force the optical element to move relative to the base, wherein there is no position-sensing element disposed inside the driving module.

In some embodiments, the optical system further includes a sensing unit and a control unit. The sensing unit is disposed outside the casing, and the sensing unit is configured to sense the movement of the optical system and output a sensing signal. The control unit is disposed outside the casing. The control unit generates a driving current based on reference data and the sensing signal, and the electromagnetic driving assembly forces the optical element to move relative to the base according to the driving current.

In some embodiments, the reference data includes a relation curve between the moving distance of the optical element and the driving current.

In some embodiments, the optical element defines an optical-axis direction, and the driving module and the sensing unit do not overlap when observed along the optical-axis direction.

In some embodiments, the electromagnetic driving assembly includes a plurality of first induction coils. The first induction coils are disposed on the base, and configured to force the optical element to move along a first direction. The first induction coils have the same length in a second direction, and the first direction is perpendicular to the second direction.

In some embodiments, the electromagnetic driving assembly includes a plurality of second induction coils. The second induction coils are disposed on the base, and configured to force the optical element to move along the second direction. The second induction coils have the same length in the first direction.

In some embodiments, the optical system further includes a circuit board disposed on the base, wherein the electromagnetic driving assembly includes a plurality of first induction coils and a plurality of second induction coils disposed in the circuit board.

In some embodiments, the circuit element is embedded in the base by insert molding.

In some embodiments, the optical system further includes a circuit board disposed on the base, wherein the electromagnetic driving assembly includes a plurality of first induction coils and a plurality of second induction coils, and the plurality of first induction coils, the plurality of second induction coils and the circuit element are disposed in the circuit board.

In some embodiments, the optical system further includes a first circuit board and a second circuit board, and the electromagnetic driving assembly includes a plurality of first induction coils and a plurality of second induction coils, wherein the plurality of first induction coils and the plurality of second induction coils are disposed in the first circuit board, and the circuit element is disposed on the second circuit board.

In some embodiments, the optical system further includes a circuit board disposed on the base, and the electromagnetic driving assembly includes a plurality of first induction coils and a plurality of second induction coils, wherein the plurality of first induction coils and the plurality of second induction coils are disposed in the circuit board, and the circuit element is formed on the base by molded interconnect device (MID) technology.

In some embodiments, the base is made of metal materials, wherein the circuit unit further includes an insulating layer disposed on the base, and the circuit element is disposed on the insulating layer.

In some embodiments, the sensing unit includes a gyroscope configured to sense the shaking of the optical system.

In some embodiments, the sensing unit includes a gravity sensor configured to sense the acceleration of the optical system.

In some embodiments, the optical system further includes an image-sensing unit and a control unit. The image-sensing unit is disposed inside the casing, and the image-sensing unit is configured to sense the light of the optical element and output an image-sensing signal. The control unit is disposed outside the casing. The control unit generates a driving current based on the image-sensing signal and reference data, and the electromagnetic driving assembly forces the optical element to move relative to the base according to the driving current.

As set forth above, the present disclosure provides an optical system and a driving module capable of forcing an optical element to move relative to the base. There is no position-sensing element in the driving module to take up space inside the driving module. Therefore, the height of the induction coils in the driving module can be reduced, so that the overall thickness of the driving module is reduced to achieve the goal of miniaturization.

Furthermore, the optical system includes a sensing unit and a control unit. The sensing unit can sense the movement of the optical system and output a sensing signal. In addition, the control unit generates a driving current based on reference data and the sensing signal, such that the electromagnetic driving assembly in the driving module forces the optical element to move relative to the base according to the driving current to achieve the goal of image stabilization.

The additional functions and advantages of the present disclosure will be disclosed in the following description, and part of the functions and advantages can be clearly understood from the following specification, or can be learned from the disclosed principles by practicing. The functions and advantages of the present disclosure can be performed and obtained using the combinations of the apparatus or devices specifically indicated in the appended claims. These or other features of the present disclosure will be further clarified by the following specification and claims, or can be learned from the disclosed principles of the present disclosure by practicing.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

In order to provide a thorough understanding of the purposes, features and advantages of the present disclosure, some embodiments of the present disclosure are set forth in the following description to provide detailed description with appended figures. The configurations of the elements in the embodiments are provided merely for purpose of explanation, but not intended to limit the present disclosure. In addition, the partial repetition of numerals in the embodiments is in order to simplify the illustration, and does not suggest any correlation between different embodiments. In the following embodiments, the mentioned directional terms, for example, up, down, left, right, front or back, merely refer to the directions in the appended figures. Therefore, the directional terms are used for purpose of explanation, and are not intended to limit the present disclosure.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean +/−20% of the stated value, more typically +/−10% of the stated value, and more typically +/−5% of the stated value. The stated value of the present disclosure is an approximate value. When there is no specific description, the stated value includes the meaning of "about" or "substantially".

Figure 1:
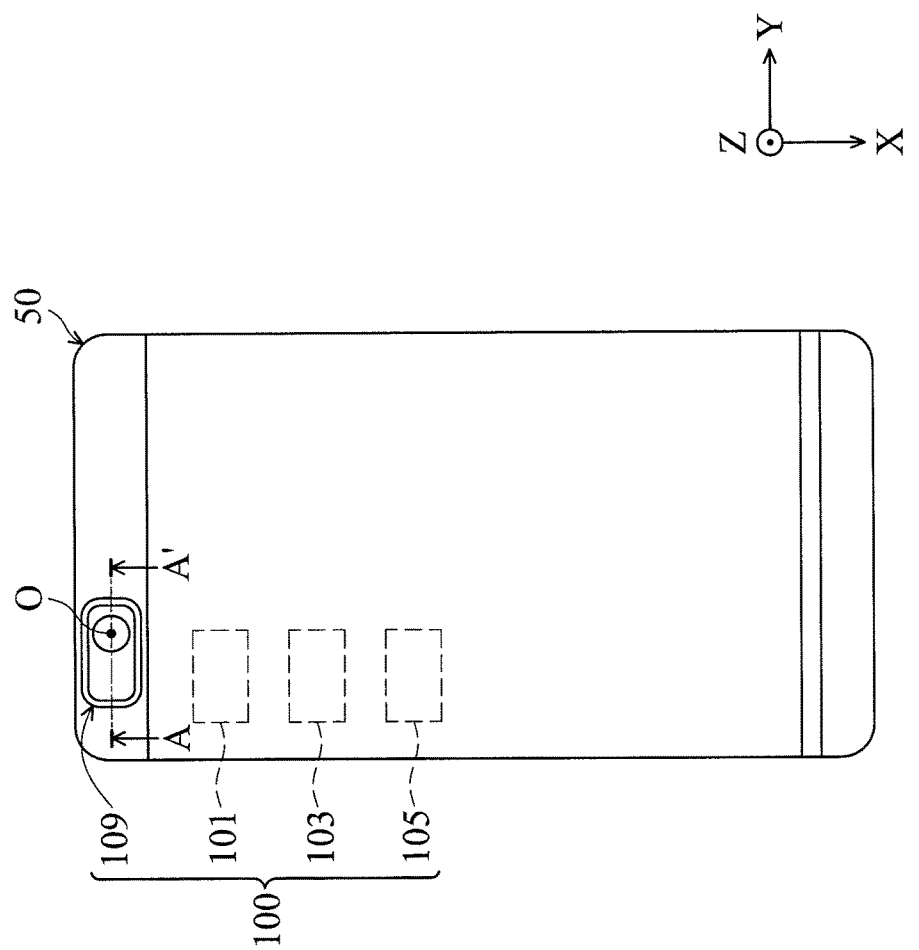
FIG. 1 is a schematic diagram of an electronic device in an embodiment of the present disclosure.
Figure 2:
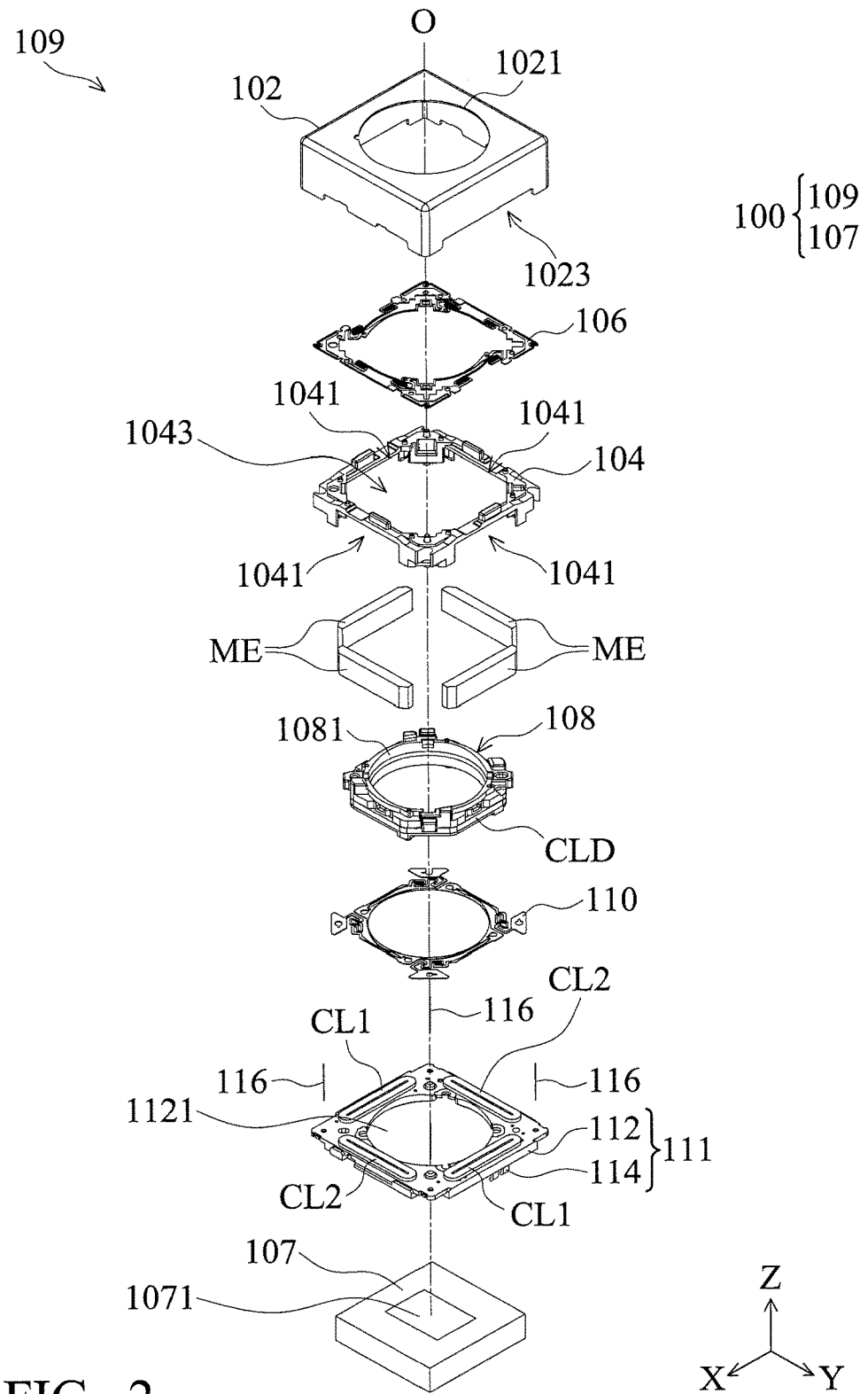
FIG. 2 is an exploded diagram of an optical system in an embodiment of the present disclosure.
Figure 3:
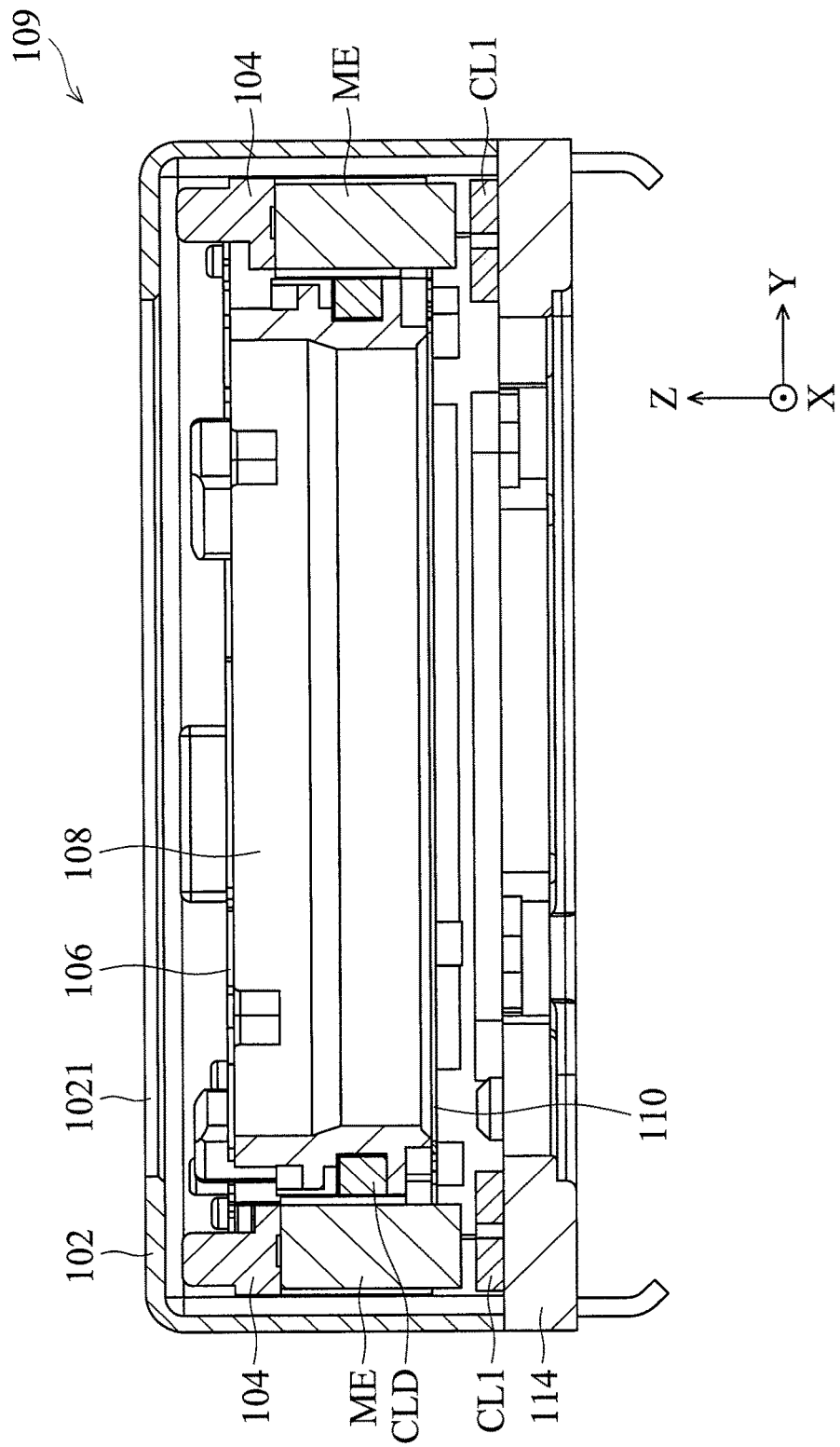
FIG. 3 is a cross-sectional view illustrating along A-A' line in FIG. 1.

Referring to FIGS. 1 to 3, FIG. 1 is a schematic diagram of an electronic device 50 in an embodiment of the present disclosure, FIG. 2 is an exploded diagram of partial elements of an optical system 100 in an embodiment of the present disclosure, and FIG. 3 is a cross-sectional view illustrating along A-A' line in FIG. 1. The electronic device 50 may be a stationary electronic device or a portable electronic device, for example, a laptop computer or a smartphone. In addition, the optical system 100 can be installed on the electronic device 50 and be configured to capture images for users. As shown in FIGS. 1 and 2, the optical system 100 may include a sensing unit 101, a control unit 103, a storage unit 105, an image-sensing unit 107 and a driving module 109. The sensing unit 101 is disposed outside the driving module 109, and configured to sense the movement of the optical system 100 and output a sensing signal. The storage unit 105 may be any type of storage media (for example, random access memory), and configured to store data, which is relevant to the electronic device 50 and the optical system 100. The control unit 103 is disposed outside the driving module 109, and can control the driving module 109 based on the data in the storage unit 105 and the sensing signal output by the sensing unit 101. As shown in FIG. 1, as viewed from the Z-axis direction, the driving module 109 and the sensing unit 101 do not overlap.

As shown in FIG. 2, the image-sensing unit 107 includes an image-sensing element 1071, which is configured to output an image-sensing signal after receiving light, and the driving module 109 is disposed on the image-sensing unit 107. In some embodiments, the driving module 109 may be a voice coil motor (VCM) with an auto-focusing (AF) function. In the embodiments, the driving module 109 of the optical system 100 can perform the functions of auto-focusing and optical image stabilization (OIS).

Referring to FIG. 2, FIG. 2 is an exploded diagram illustrating the driving module 109 and the image-sensing unit 107 in the optical system 100 (for clarity of illustration, the sensing unit 101, the control unit 103 and the storage unit 105 are not shown in FIG. 2). The driving module 109 includes a casing 102, a frame 104, an upper plated spring 106, a lens holder 108, a driving coil CLD, two first induction coils CL1, two second induction coils CL2, four magnetic elements ME, a lower plated spring 110 and a circuit unit 111. The circuit unit 111 may include a base 112 and at least one circuit element 114, and the circuit unit 111 may be connected to the casing 102 to constitute a fixed portion. The casing 102 has a hollow structure, and a casing opening 1021 is formed thereon. A base opening 1121 is formed on the base 112. The center of the casing opening 1021 corresponds to an optical axis O of an optical element (not shown) that is held by the lens holder 108. The base opening 1121 corresponds to the image-sensing element 1071 disposed underlying the base 112. The casing 102 may have an accommodating space 1023, which is configured to accommodate the frame 104, the upper plated spring 106, the lens holder 108, the driving coil CLD, the two first induction coils CL1, the two second induction coils CL2, the magnetic elements ME and the lower plated spring 110. In addition, the casing 102 may also accommodate the circuit unit 111 and the image-sensing unit 107. Moreover, the first induction coils CL1, the second induction coils CL2 and the magnetic elements ME can constitute an electromagnetic driving assembly, which is electrically connected to the circuit element 114 and can force the lens holder 108 to move relative to the base 112. The numbers of the first induction coils CL1 and the second induction coils CL2 are not limited to the embodiment. It should be noted that there is no position-sensing element inside the driving module 109.

As shown in FIG. 2, the lens holder 108 has a hollow ring structure, and the lens holder further has a through hole 1081. The through hole 1081 forms a threaded structure (not shown) corresponding to another threaded structure (not shown) on the optical element such that the optical element can be locked in the through hole 1081. In addition, the driving coil CLD can be disposed on and surrounding the lens holder 108. Furthermore, the frame 104 has a plurality of recesses 1041 and a central opening 1043. In the embodiments, the frame 104 has four recesses 1041 configured to accommodate the four magnetic elements ME. However, the numbers of recesses 1041 and magnetic elements ME are not limited thereto. The lens holder 108 and the optical element are disposed in the central opening 1043, and can move relative to the frame 104. More specifically, as shown in FIG. 3 (FIG. 3 merely shows a cross-sectional view of the driving module 109), the upper plated spring 106 and the lower plated spring 110 are connected to the frame 104, thereby the lens holder 108 can hang in the central opening 1043. When the driving coil CLD is electrified, the four magnetic elements ME and the driving coil CLD will generate electromagnetic driving force, thereby the lens holder 108 is forced to move along the optical axis O (Z-axis direction) relative to the frame 104 to perform auto-focusing.

In addition, as shown in FIG. 2, the optical system 100 further includes four elastic elements 116, wherein each of the elastic elements 116 has an elongated structure, such as a columnar or linear structure, but it is not limited thereto. An end of each of the elastic elements 116 is connected to the upper plated spring 106, and the other end of each of the elastic elements 116 is connected to the base 112 and electrically connected to the circuit element 114. Through the above structural configuration, the lens holder 108, the optical element (not shown) held thereby and the frame 104 can move along the direction parallel to X-Y plane relative to the base 112 through four flexible elastic elements 116.

Figure 4:
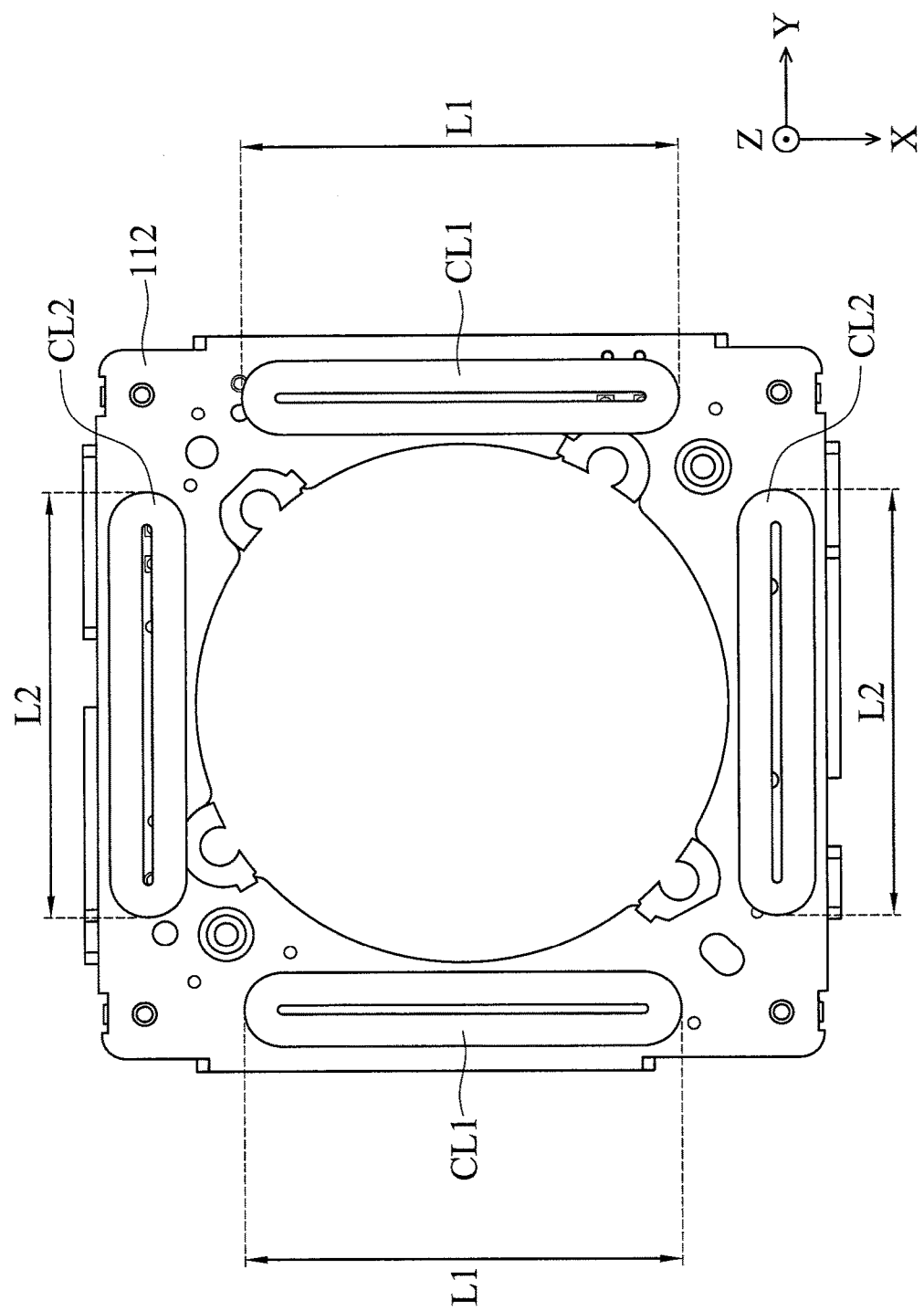
FIG. 4 is a schematic diagram of first induction coils, second induction coils and a base in an embodiment of the present disclosure.

Referring to FIGS. 2-4, FIG. 4 is a schematic diagram of the first induction coils CL1, the second induction coils CL2 and the base 112 in an embodiment. As shown in FIGS. 2-4, the first induction coils CL1 and the second induction coils CL2 are disposed on the base 112. In addition, as shown in FIG. 4, two of the first induction coils CL1 have the same length L1 in the X-axis direction (a second direction), and two of the second induction coils CL2 have the same length L2 in the Y-axis direction (a first direction). The first direction is perpendicular to the second direction, and the length L1 may be equal to the length L2 in the embodiment, but they are not limited thereto. For example, in some other embodiments, the length L1 may be different than the length L2.

When the first induction coils CL1 are electrified and have induction with the corresponding magnetic elements ME, the electromagnetic driving force is generated to force the lens holder 108 and the optical element to move along the Y-axis direction (the first direction). When the second induction coils CL2 are electrified and have induction with the corresponding magnetic elements ME, the electromagnetic driving force is generated to force the lens holder 108 and the optical element to move along the X-axis direction (the second direction). Therefore, when the optical system 100 is shaken, the lens holder 108 can be forced to move on the X-Y plane by the electromagnetic driving force, such that the goal of optical image stabilization is achieved.

Figure 5:
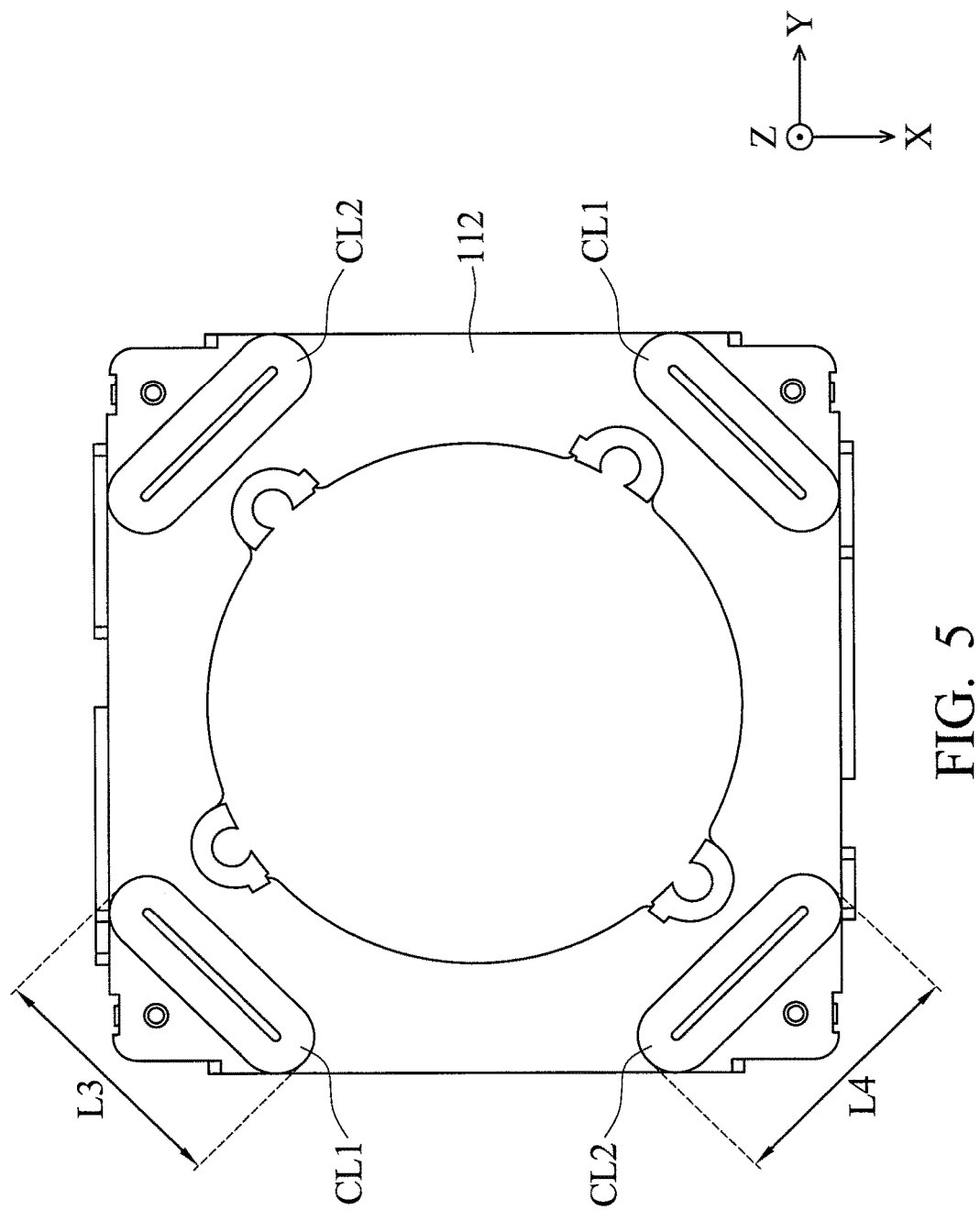
FIG. 5 is a schematic diagram of first induction coils, second induction coils and a base in another embodiment of the present disclosure.

Referring to FIG. 5, FIG. 5 is a schematic diagram of the first induction coils CL1, the second induction coils CL2 and the base 112 in another embodiment of the present disclosure. In the embodiment, the first induction coils CL1 and the second induction coils CL2 are disposed at the corners of the base 112. In addition, two of the first induction coils CL1 have the same length L3, two of the second induction coils CL2 have the same length L4, and the length L3 may be equal to the length L4. The disposed positions of the first induction coils CL1 and the second induction coils CL2 are not limited to the embodiment and the aforementioned embodiments. The disposed positions of the first induction coils CL1 and the second induction coils CL2 may be determined depending on actual demand.

Figure 6:
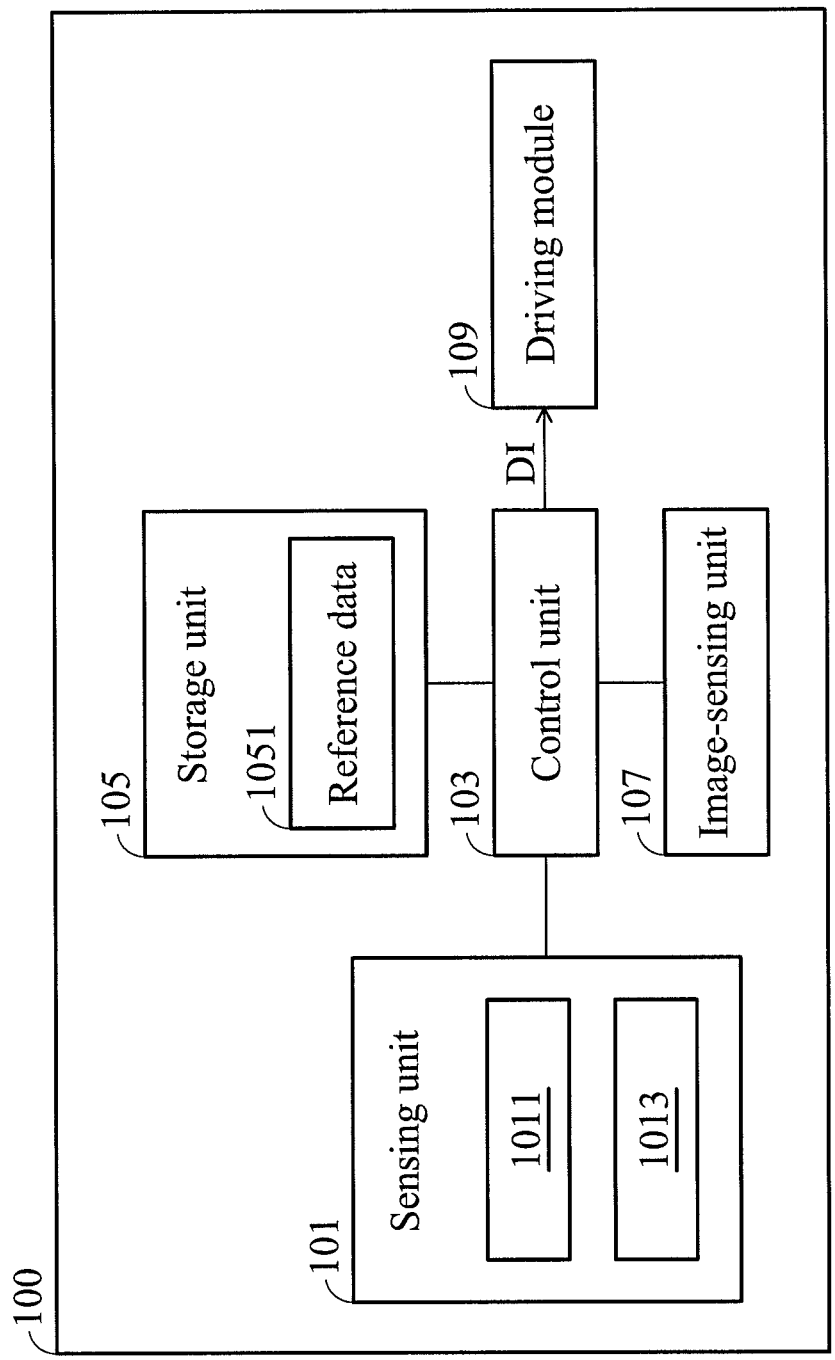
FIG. 6 is a block diagram of an optical system in an embodiment of the present disclosure.
Figure 7:
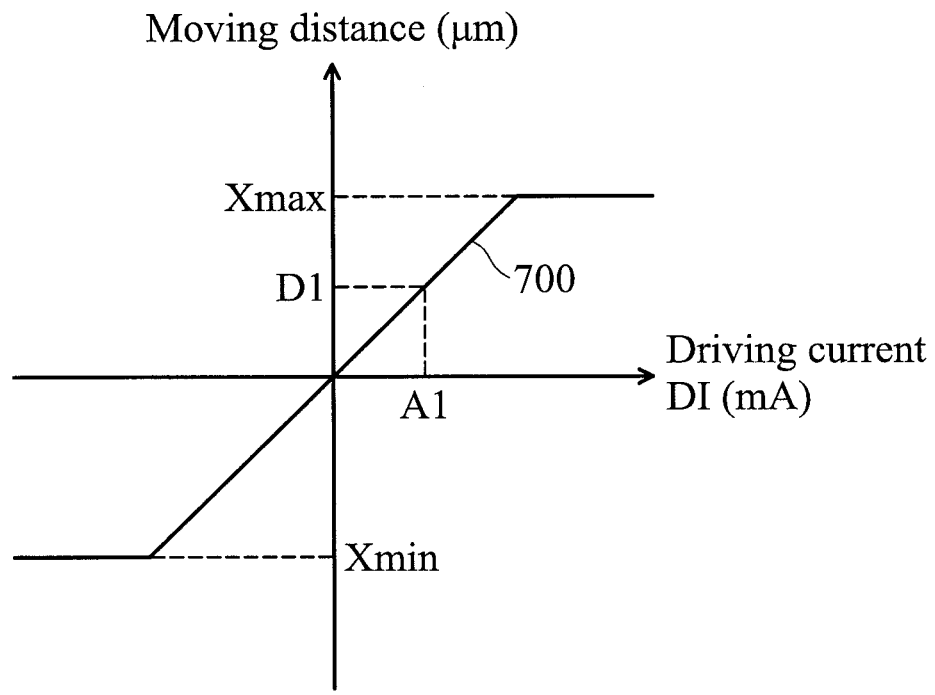
FIGS. 7 and 8 are relation diagrams between the driving current and the moving distance.
Figure 8:
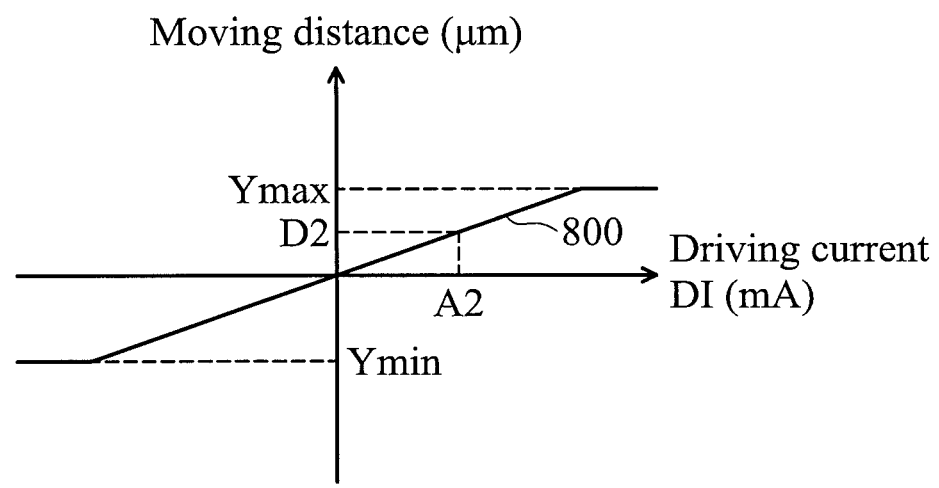

Referring to FIGS. 6-8, FIG. 6 is a block diagram of the optical system 100 in an embodiment of the present disclosure, and FIGS. 7 and 8 are relation diagrams between the driving current and the moving distance. As shown in FIG. 6, the control unit 103 of the optical system 100 is electrically connected to the sensing unit 101, the storage unit 105, the image-sensing unit 107 and the driving module 109 independently. The sensing unit 101 may include a gyroscope 1011 and a gravity sensor 1013 respectively configured to sense the shake and the acceleration of the optical system 100, and correspondingly output sensing signals to the control unit 103. Furthermore, reference data 1051, which may include multiple data about the driving current and the moving distance, can be stored in the storage unit 105. Then, the control unit 103 can generate a driving current DI based on the sensing signals and the reference data 1051, such that the electromagnetic driving assembly forces the lens holder 108 and the optical element to move relative to the base 112 based on the driving current DI.

As shown in FIG. 7, a relation curve 700 shows the relationship between the moving distance, which the driving module 109 forces the lens holder 108 and the optical element to move along X-axis direction, and the driving current. The relation curve 700 can be included in the reference data 1051. For example, when the lens holder 108 and the optical element are shaken, the control unit 103 can sense that the lens holder 108 moves a distance D1 towards the –(negative) X-axis direction based on the sensing signals output by the sensing unit 101. Therefore, the control unit 103 can provide a driving current DI for the driving module 109 (now the driving current DI is A1 mA), such that the lens holder 108 can be forced to move the distance D1 in the (positive) X-axis direction, thereby compensating for the shaking of the lens holder 108. Similarly, a relation curve 800 in FIG. 8 shows the relationship between the moving distance, which the driving module 109 forces the lens holder 108 and the optical element to move along the Y-axis direction, and the driving current. The relation curve 800 can be included in the reference data 1051. For example, when the lens holder 108 and the optical element are shaken, the control unit 103 can obtain that the lens holder 108 moves a distance D2 towards −(negative) Y-axis direction based on the sensing signals output by the sensing unit 101. Therefore, the control unit 103 can provide a driving current DI for the driving module 109 (now the driving current DI is A2 mA), such that the lens holder 108 can be forced to move the distance D2 in the (positive) Y-axis direction, thereby compensating for the shaking of the lens holder 108.

It should be noted that the relationship between the relation curves 700 and 800 is not limited to the present disclosure. In an embodiment, the slope of the relation curve 700 may be the same as or different from that of the relation curve 800. Furthermore, it is obvious that the lens holder 108 is limited in moving distance ranges of Xmax to Xmin and Ymax to Ymin from the relation curves 700 and 800 in FIGS. 7 and 8.

In addition, the control unit 103 can control the distance that the lens holder 108 moves along the Z-axis direction relative to the base 112, based on the image-sensing signals output by the image-sensing element 1071. For example, the control unit 103 can control the driving module 109 to force the lens holder 108 to move along the Z-axis direction, and obtain multiple image-sensing signals. The control unit 103 can determine the best image-sensing signal and a corresponding position based on the image-sensing signals. Then, the control unit 103 can control the lens holder 108 to move into the corresponding position, thereby the optical system 100 can capture clear images. For details of the control method of the control unit 103, please refer to Taiwan Patent No. I569081 issued on Feb. 1, 2017.

Figure 9:
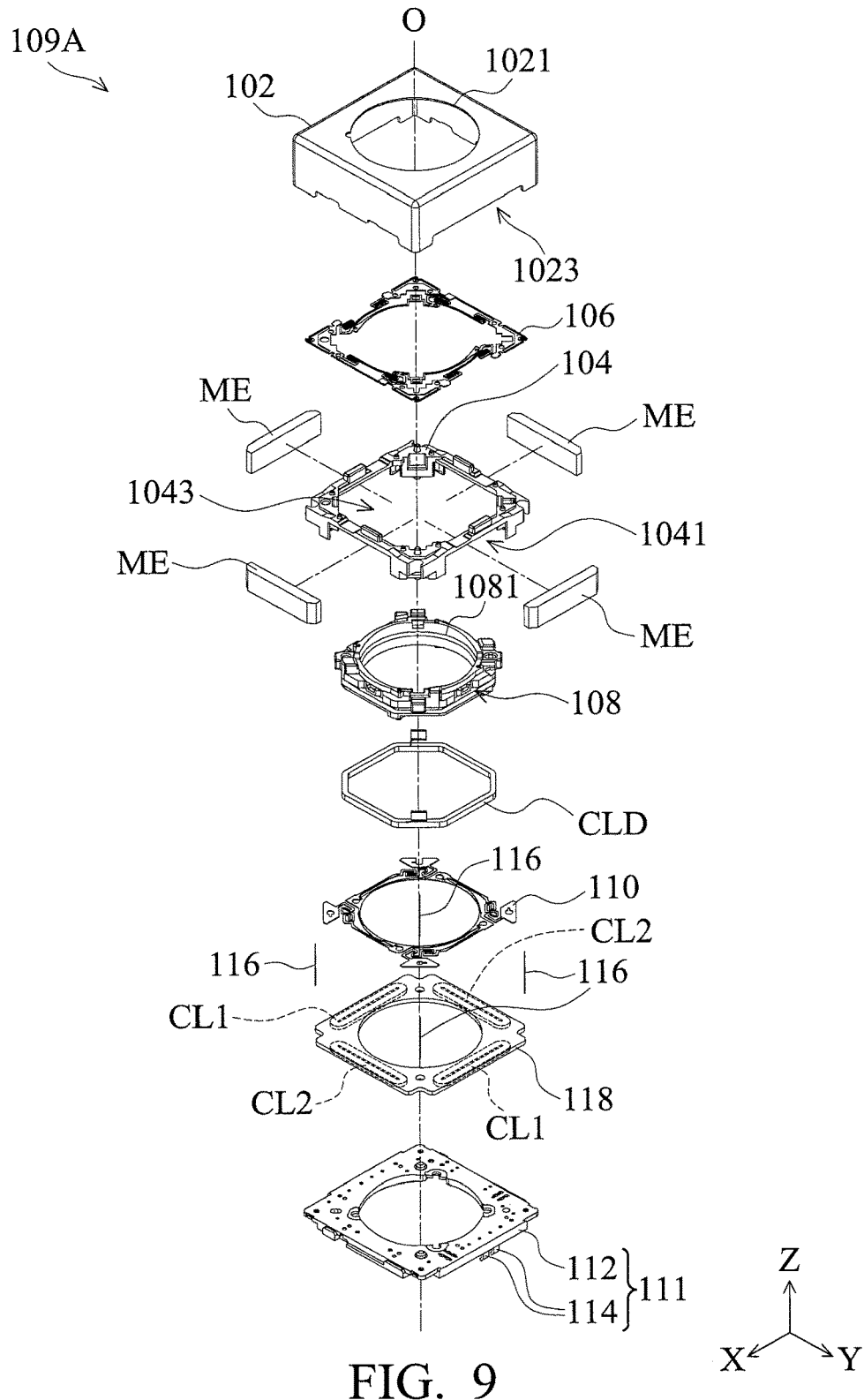
FIG. 9 is an exploded diagram of a driving module in an embodiment of the present disclosure.

Referring to FIG. 9, FIG. 9 is an exploded diagram of a driving module 109A in an embodiment of the present disclosure. In the embodiment, the driving module 109A can further include a circuit board 118 disposed on the base 112, and the first induction coils CL1 and the second induction coils CL2 are disposed in the circuit board 118. In addition, the circuit element 114 of this embodiment and the circuit element 114 of the embodiment shown in FIG. 2 are both embedded in the base 112 by insert molding. The thickness of the driving module 109A in the Z-axis direction can be reduced by the above-mentioned configuration to achieve the goal of miniaturization.

Furthermore, in another embodiment, the first induction coils CL1, the second induction coils CL2 and the circuit element 114 can also be designed to be disposed together in the circuit board 118 such that the thickness of the driving module 109A in the Z-axis direction is reduced further.

Figure 10:
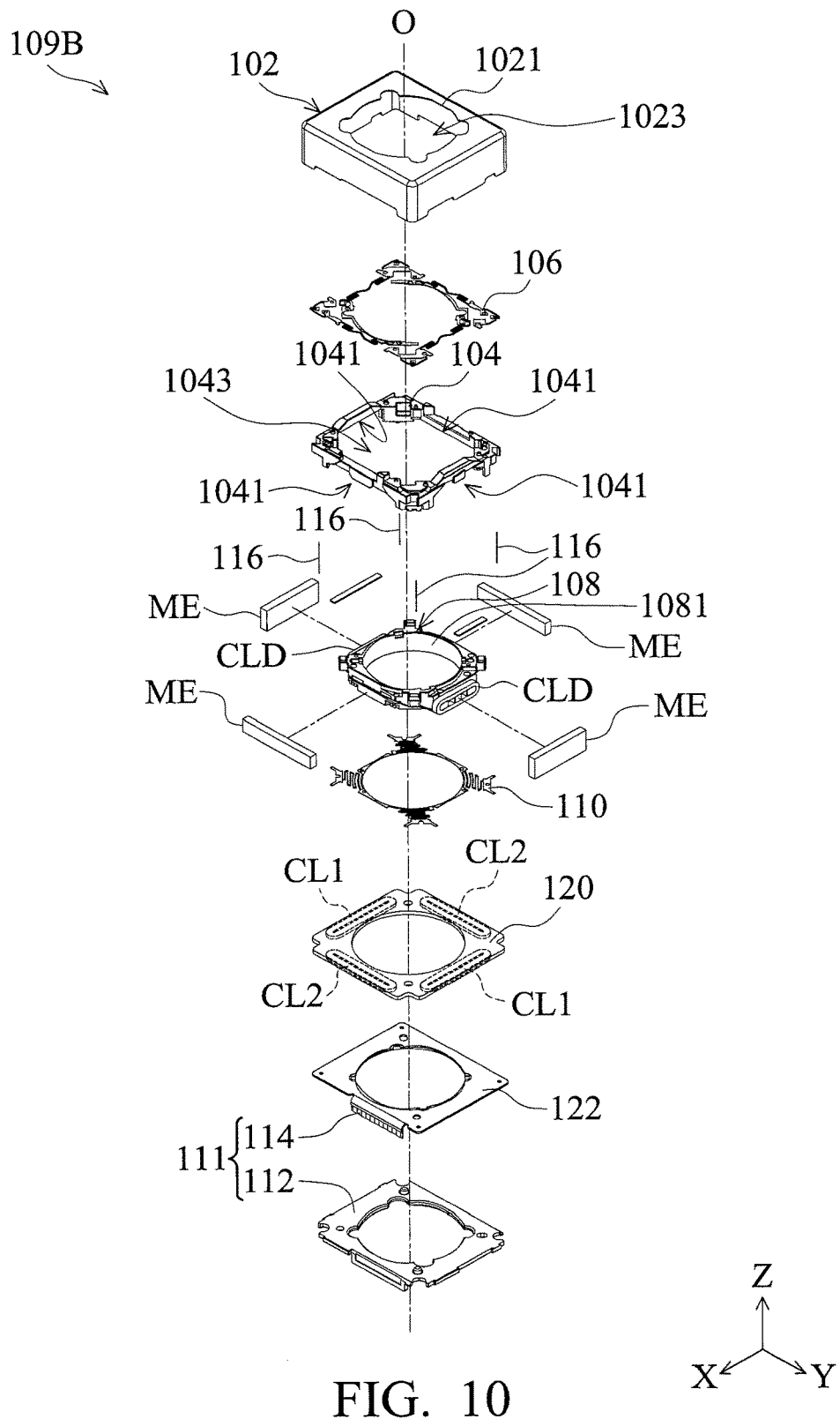
FIG. 10 is an exploded diagram of a driving module in another embodiment of the present disclosure.

Referring to FIG. 10, FIG. 10 is an exploded diagram of a driving module 109B in another embodiment of the present disclosure. In the embodiment, the driving module 109B can further include a first circuit board 120 and a second board 122, wherein the second board 122 can be a flexible printed circuit (FPC) disposed on the base 112, and the first circuit board 120 is disposed on the second board 122. The first induction coils CL1 and the second induction coils CL2 are disposed in the first circuit board 120, and the circuit element 114 is disposed on the second circuit board 122. In addition, the embodiment can include two driving coils CLD disposed on opposite sides of the lens holder 108.

Figure 11:
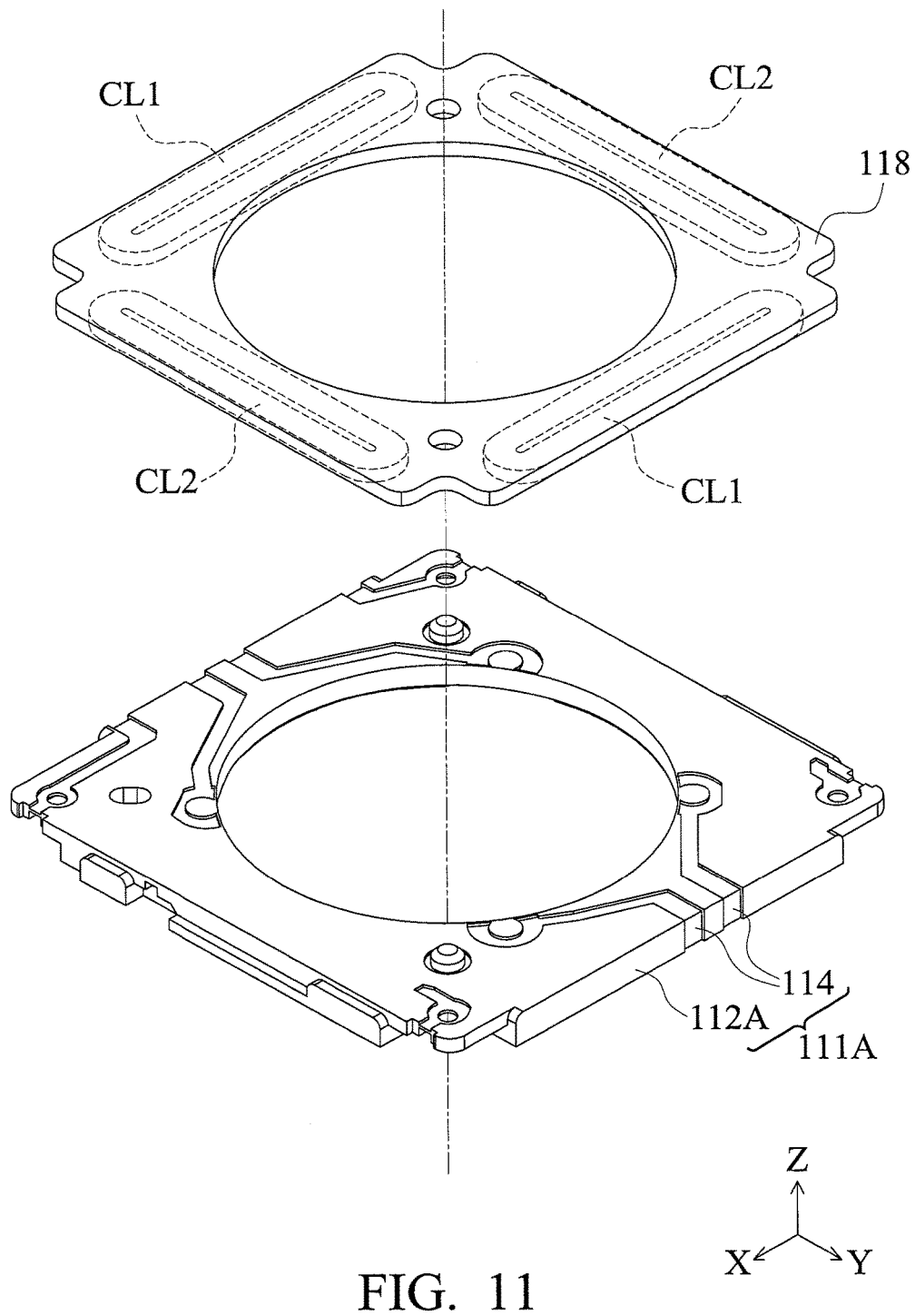
FIG. 11 is a schematic diagram of a circuit board and a circuit unit in an embodiment of the present disclosure.

Referring to FIG. 11, FIG. 11 is a schematic diagram of the circuit board 118 and a circuit unit 111A in another embodiment of the present disclosure. In the embodiment, the circuit board 118 is disposed on a base 112A of the circuit unit 111A, and the first induction coils CL1 and the second induction coils CL2 are disposed in the circuit board 118. It should be noted that the base 112A is made of plastic materials, and the circuit element 114 is formed on the base 112A by molded interconnect device (MID) technology. The thickness of the base 112A in the Z-axis direction can be reduced by using the above design to achieve the goal of further miniaturization.

Figure 12:
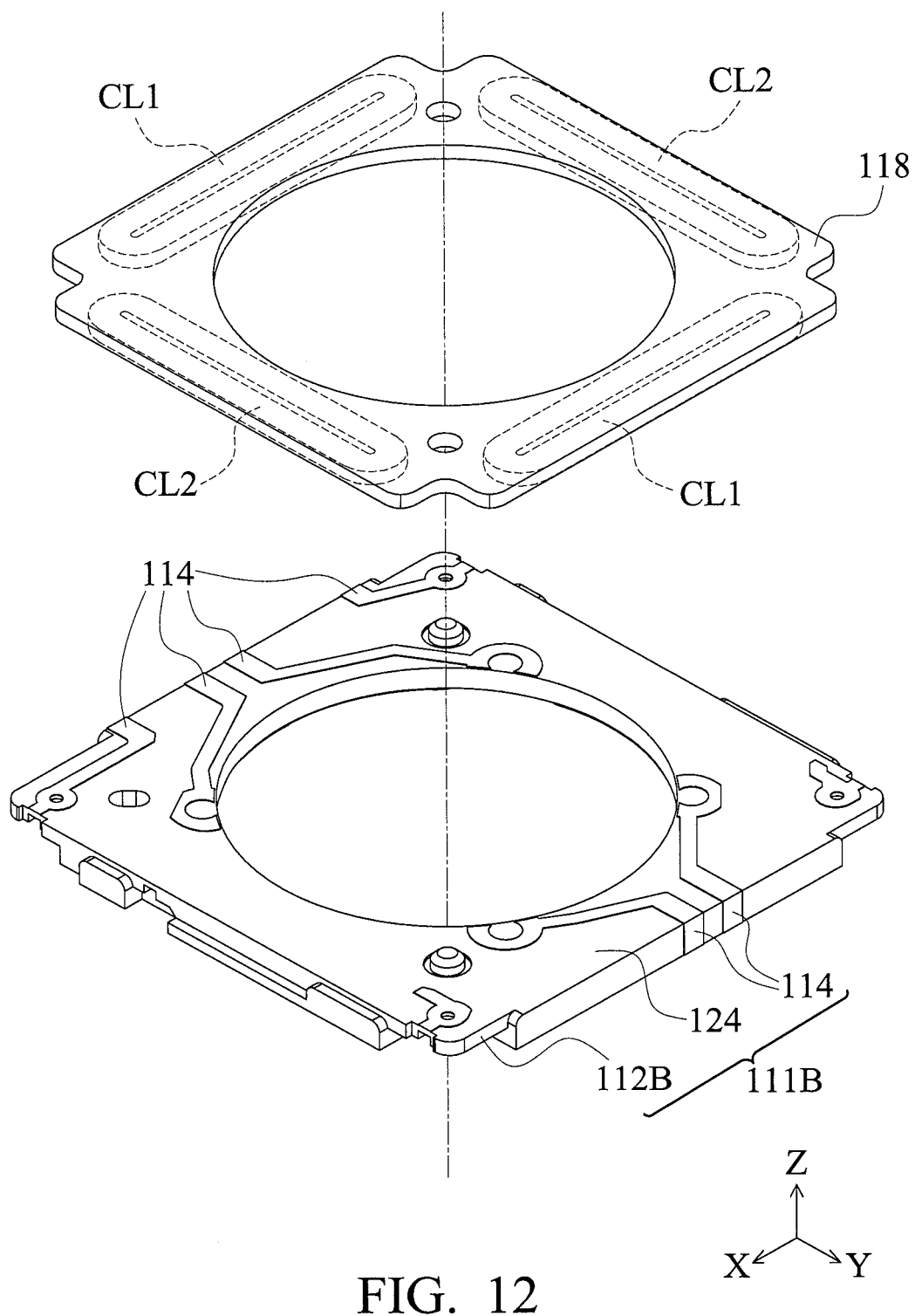
FIG. 12 is a schematic diagram of a circuit board and a circuit unit in another embodiment of the present disclosure.

Referring to FIG. 12, FIG. 12 is a schematic diagram of the circuit board 118 and a circuit unit 111B in another embodiment of the present disclosure. Similar to the aforementioned embodiment, in this embodiment, the circuit board 118 is disposed on a base 112B of the circuit unit 111B, and the first induction coils CL1 and the second induction coils CL2 are disposed in the circuit board 118. It should be noted that the base 112B is made of metal materials (for example, Fe-containing alloys), and the base 112B can be bonded to the casing 102, which is shown in FIG. 9, by welding. In addition, in the embodiment, the circuit unit 111B may further include an insulating layer 124 disposed on the base 112B, and the circuit element 114 is disposed on the insulating layer 124. Because the insulating layer 124 is disposed between the circuit element 114 and the base 112B made of metal materials, the circuit element 114 is not electrically connected to the base 112B. By using the above design, the structure strength of the base 112B can be improved, and the thickness of the base 112B in the Z-axis direction can be reduced, thereby achieving the goal of miniaturization.

In summary, the embodiments of the disclosure provide an optical system and a driving module capable of forcing an optical element to move relative to the base. There is no position-sensing element inside the driving module to take up space inside the driving module. Therefore, the height of the induction coils in the driving module can be reduced, so that the overall thickness of the driving module is reduced to achieve the goal of miniaturization.

In addition, the optical system includes a sensing unit and a control unit. The sensing unit can sense the movement of the optical system and output a sensing signal, and the control unit generates a driving current based on reference data and the sensing signal. As a result, the electromagnetic driving assembly in the driving module forces the optical element to move relative to the base according to the driving current to achieve the goal of image stabilization.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure, as long as may perform substantially the same function in the aforementioned embodiments and obtain substantially the same result may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical system, comprising:
   an optical element defining an optical-axis direction;
   a driving module, comprising:
      a fixed portion, comprising:
         a casing; and
         a circuit unit connected to the casing, wherein the circuit unit comprises a base and a circuit element embedded in the base;
      a lens holder, disposed in the casing, carrying the optical element; and
      an electromagnetic driving assembly disposed in the casing and electrically connected to the circuit element, wherein the electromagnetic driving assembly is configured to force the optical element to move relative to the base, and there is no position-sensing element inside the driving module;
   a sensing unit disposed outside the casing, wherein the sensing unit is configured to sense a movement of the optical system and output a sensing signal, and the driving module and the sensing unit do not overlap when observed along the optical-axis direction; and
   a control unit, disposed outside the casing, electrically connected to the driving module and the sensing unit, wherein the control unit generates a driving current based on reference data and the sensing signal, and the electromagnetic driving assembly forces the optical element to move relative to the base according to the driving current, wherein the reference data includes a relation curve between a moving distance of the optical element and the driving current.

2. The optical system as claimed in claim 1, wherein the sensing unit comprises a gyroscope configured to sense a shaking of the optical system.

3. The optical system as claimed in claim 1, wherein the sensing unit comprises a gravity sensor configured to sense an acceleration of the optical system.

4. The optical system as claimed in claim 1, further comprising a circuit board disposed on the base, wherein the electromagnetic driving assembly comprises a plurality of first induction coils and a plurality of second induction coils disposed in the circuit board.

5. The optical system as claimed in claim 4, wherein the circuit element is embedded in the base by insert molding.

6. The optical system as claimed in claim 1, wherein the base is made of a metal material, the circuit unit further includes an insulating layer disposed on the base, and the circuit element is disposed on the insulating layer.

7. The optical system as claimed in claim 1, further comprising:
   an image-sensing unit disposed inside the casing and electrically connected to the circuit element, wherein the image-sensing unit is configured to sense light passing through the optical element and output an image-sensing signal; and
   a control unit disposed outside the casing, electrically connected to the driving module and the image-sensing unit, wherein the control unit generates a driving current based on the image-sensing signal and reference data, and the electromagnetic driving assembly forces the optical element to move relative to the base according to the driving current.

8. An optical system, comprising:
   an optical element; and
   a driving module, comprising:
      a fixed portion, comprising:
         a casing; and
         a circuit unit connected to the casing, wherein the circuit unit comprises a base and a circuit element embedded in the base;
      a lens holder, disposed in the casing, carrying the optical element; and
      an electromagnetic driving assembly disposed in the casing and electrically connected to the circuit element, wherein the electromagnetic driving assembly is configured to force the optical element to move relative to the base, and there is no position-sensing element inside the driving module, wherein the electromagnetic driving assembly includes a plurality of first induction coils disposed on the base and configured to force the optical element to move along a first direction, each of the first induction coils has the same length along a second direction, and the first direction is perpendicular to the second direction.

9. The optical system as claimed in claim 8, wherein the electromagnetic driving assembly includes a plurality of second induction coils disposed on the base, and configured to force the optical element to move along the second direction, and each of the second induction coils has the same length along the first direction.

10. The optical system as claimed in claim 9, wherein the circuit element is embedded in the base by insert molding.

11. An optical system, comprising:
    an optical element;
    a driving module, comprising:
       a fixed portion, comprising:
          a casing; and
          a circuit unit connected to the casing, wherein the circuit unit comprises a base and a circuit element;
       a lens holder, disposed in the casing, carrying the optical element; and
       an electromagnetic driving assembly disposed in the casing and electrically connected to the circuit element, wherein the electromagnetic driving assembly is configured to force the optical element to move relative to the base, and there is no position-sensing element inside the driving module; and
    a circuit board disposed on the base, wherein the electromagnetic driving assembly comprises a plurality of first induction coils and a plurality of second induction coils, and the plurality of first induction coils, the plurality of second induction coils and the circuit element are disposed in the circuit board.

12. An optical system, comprising:
    an optical element;
    a driving module, comprising:
       a fixed portion, comprising:
          a casing; and
          a circuit unit connected to the casing, wherein the circuit unit comprises a base and a circuit element;
       a lens holder, disposed in the casing, carrying the optical element; and
       an electromagnetic driving assembly disposed in the casing and electrically connected to the circuit element, wherein the electromagnetic driving assembly is configured to force the optical element to move relative to the base, and there is no position-sensing element inside the driving module, wherein the electromagnetic driving assembly comprises a plurality of first induction coils and a plurality of second induction coils;

a first circuit board, wherein the plurality of first induction coils and the plurality of second induction coils are disposed in the first circuit board; and a second circuit board, wherein the circuit element is disposed on the second circuit board.

13. The optical system as claimed in claim 12, wherein the second circuit board is a flexible printed circuit.

14. An optical system, comprising:
an optical element;
a driving module, comprising:
   a fixed portion, comprising:
     a casing; and
     a circuit unit connected to the casing, wherein the circuit unit comprises a base and a circuit element;
   a lens holder, disposed in the casing, carrying the optical element; and
   an electromagnetic driving assembly disposed in the casing and electrically connected to the circuit element, wherein the electromagnetic driving assembly is configured to force the optical element to move relative to the base, and there is no position-sensing element inside the driving module, wherein the electromagnetic driving assembly comprises a plurality of first induction coils and a plurality of second induction coils; and
a circuit board disposed on the base, wherein the electromagnetic driving assembly comprises a plurality of first induction coils and a plurality of second induction coils, the plurality of first induction coils and the plurality of second induction coils are disposed in the circuit board, and the circuit element is formed on the base by molded interconnect device technology.

15. An optical system, comprising:
an optical element; and
a driving module, comprising:
   a fixed portion, comprising:
     a casing; and
     a circuit unit connected to the casing, wherein the circuit unit comprises a base and a circuit element;
   a lens holder, disposed in the casing, carrying the optical element; and
   an electromagnetic driving assembly disposed in the casing and electrically connected to the circuit element, wherein the electromagnetic driving assembly is configured to force the optical element to move relative to the base, and there is no position-sensing element inside the driving module, wherein the electromagnetic driving assembly comprises a plurality of first induction coils and a plurality of second induction coils, wherein the electromagnetic driving assembly comprises at least two first induction coils disposed on two opposite corners of the base, and the length of each first induction coil is the same.

16. The optical system as claimed in claim 15, wherein the electromagnetic driving assembly comprises at least two second induction coils disposed on the base on the other two opposite corners of the base, and the length of each second induction coil is the same.

\* \* \* \* \*